United States Patent
Hennesy et al.

(10) Patent No.: US 10,312,498 B2
(45) Date of Patent: Jun. 4, 2019

(54) SECURITY DEVICE FOR A BATTERY PACK

(71) Applicant: Black & Decker Inc., Newark, DE (US)

(72) Inventors: Timothy J. Hennesy, Baltimore, MD (US); Kevin M. Alston, Baltimore, MD (US); Michael Varipatis, Fallston, MD (US)

(73) Assignee: Black & Decker, Inc., New Britain, CT (US)

( * ) Notice: Subject to any disclaimer, the term of this patent is extended or adjusted under 35 U.S.C. 154(b) by 0 days.

(21) Appl. No.: 15/722,853

(22) Filed: Oct. 2, 2017

(65) Prior Publication Data

US 2019/0103597 A1    Apr. 4, 2019

(51) Int. Cl.
*H01M 2/34* (2006.01)
*E05B 39/02* (2006.01)
*G09F 3/03* (2006.01)

(52) U.S. Cl.
CPC ............ *H01M 2/341* (2013.01); *E05B 39/02* (2013.01); *G09F 3/037* (2013.01); *G09F 3/0311* (2013.01); *G09F 3/0329* (2013.01); *H01M 2220/30* (2013.01)

(58) Field of Classification Search
CPC .............. Y10T 24/1402; Y10T 24/141; Y10T 24/1498; B65D 55/02; A47B 2097/008; B60P 7/0823; B61D 45/001; H01M 2/341; H01M 2220/30; E05B 39/02; E05B 73/0005; E05B 73/0017; E05B 73/0029; G09F 3/0311; G09F 3/0329; G09F 3/037

USPC ..... 70/14, 18, 19, 57.1, 58, 258; 292/307 R, 292/307 A, 318, 325; 206/1.5, 703, 807; 224/902; 248/499, 505, 506, 510, 248/551–553
See application file for complete search history.

(56) References Cited

U.S. PATENT DOCUMENTS

| | | | | |
|---|---|---|---|---|
| 1,577,292 A | * | 3/1926 | Obreiter | H01M 2/1083 16/DIG. 15 |
| 2,481,755 A | * | 9/1949 | Jones | B60K 11/04 180/68.4 |
| 3,311,957 A | * | 4/1967 | Dunn | F16L 33/035 24/20 EE |
| 4,198,772 A | * | 4/1980 | Furutu | G09F 3/00 292/318 |
| 4,333,210 A | * | 6/1982 | Burnett | B65D 33/34 24/16 PB |

(Continued)

*Primary Examiner* — Lloyd A Gall
(74) *Attorney, Agent, or Firm* — Michael Arnoff; Joseph F. Key

(57) ABSTRACT

A security device for a battery pack includes a cap, which covers at least a portion of a slide mechanism of a slide battery pack, and a strap. The cap includes a first collar disposed around a first opening and a second collar disposed around a second opening, with the first collar and the second collar aligned along a longitudinal axis of the slide battery pack. The strap matches a contour of the slide battery pack and includes a first projection and a second projection. The strap is positioned along the longitudinal axis of the slide battery pack and the cap is positioned over the strap with the first projection inserted through the first opening and the first collar and the second projection inserted through the second opening and the second collar to secure the cap to the strap and to the slide battery pack.

20 Claims, 10 Drawing Sheets

(56) References Cited

U.S. PATENT DOCUMENTS

| | | | | |
|---|---|---|---|---|
| 4,506,921 A | * | 3/1985 | Swift | G09F 3/0358 292/318 |
| 4,722,562 A | * | 2/1988 | Burt | G09F 3/0323 292/318 |
| 4,805,856 A | * | 2/1989 | Nicoli | F16L 3/233 24/16 PB |
| 5,183,301 A | * | 2/1993 | Lundberg, Jr. | B65D 63/1063 292/318 |
| 5,241,982 A | * | 9/1993 | Taylor | B60H 3/00 137/384 |
| 5,437,172 A | * | 8/1995 | Lamy | B65D 73/0064 206/807 |
| 5,547,160 A | * | 8/1996 | Johnson | B60R 16/04 180/68.5 |
| 5,794,461 A | * | 8/1998 | Smith | B65D 63/1072 292/318 |
| 5,884,949 A | * | 3/1999 | Leon | G09F 3/0317 292/318 |
| 5,969,613 A | * | 10/1999 | Yeager | E05B 73/0017 340/568.1 |
| 6,102,356 A | * | 8/2000 | Huntley | H01M 2/1083 248/500 |
| 6,220,562 B1 | * | 4/2001 | Konkle | A47B 97/00 24/298 |
| 6,326,890 B1 | | 12/2001 | Costa | |
| 6,543,261 B2 | * | 4/2003 | Kolton | G08B 13/2402 24/30.5 P |
| 6,640,394 B1 | * | 11/2003 | Berrocal | B65D 63/1063 24/16 PB |
| 6,871,829 B2 | * | 3/2005 | Shannon, Jr. | A47G 11/002 180/68.5 |
| 6,981,683 B2 | * | 1/2006 | Winton, III | F16B 11/002 248/505 |
| 7,259,674 B2 | | 8/2007 | Marsilio et al. | |
| 7,397,375 B2 | | 7/2008 | Marsilio et al. | |
| 7,463,152 B2 | | 12/2008 | Marsilio et al. | |
| 7,464,569 B2 | * | 12/2008 | Kolton | B65D 33/25 24/381 |
| 7,486,190 B2 | | 2/2009 | Marsilio et al. | |
| 7,492,263 B2 | | 2/2009 | Marsilio et al. | |
| 7,492,264 B2 | | 2/2009 | Marsilio et al. | |
| 7,492,265 B2 | | 2/2009 | Marsilio et al. | |
| 7,498,944 B2 | | 3/2009 | Marsilio et al. | |
| 7,498,945 B2 | | 3/2009 | Marsilio et al. | |
| 7,602,297 B2 | | 10/2009 | Marsilio et al. | |
| 7,650,768 B2 | | 1/2010 | Fawcett et al. | |
| 7,804,405 B2 | * | 9/2010 | Norman | B65D 51/18 340/572.1 |
| 7,878,033 B2 | | 2/2011 | Fawcett et al. | |
| 9,189,663 B2 | | 11/2015 | Goren et al. | |
| 9,449,268 B2 | | 9/2016 | Goren et al. | |
| 9,540,849 B2 | * | 1/2017 | Renfro | E05B 73/00 |
| 9,547,965 B2 | | 1/2017 | Goren et al. | |
| 9,672,708 B2 | | 6/2017 | Goren et al. | |
| 9,802,743 B2 | * | 10/2017 | Foreman | F16L 3/222 |
| 2010/0242552 A1 | | 9/2010 | Sayegh et al. | |
| 2013/0091905 A1 | | 4/2013 | Brown | |

* cited by examiner

SECURITY DEVICE FOR A BATTERY PACK

TECHNICAL FIELD

This description relates to a security device for a battery pack.

BACKGROUND

Security devices, or anti-theft devices, are used to deter the theft of goods, such as consumer products, from stores. Typically, it is desirable for the security devices to be hard to remove in the store or to be conspicuous if the consumer attempts to remove the security device in the store. At the same time, it is desirable for the security devices to be relatively easy for the consumer to remove outside of the store after purchasing the product. Furthermore, it is desirable to make the security device easy to attach to the product.

SUMMARY

According to one general aspect, a security device for a battery pack, includes a cap that is shaped and configured to cover at least a portion of a slide mechanism of a slide battery pack. The cap includes a first collar disposed around a first opening and a second collar disposed around a second opening with the first collar and the second collar aligned along a longitudinal axis of the slide battery pack. The security device includes a strap that is shaped and configured to match a contour of the slide battery pack along the longitudinal axis of the slide battery pack. The strap includes a first end having a first projection that extends perpendicular from a top surface of the strap and a second end having a second projection that extends perpendicular from the top surface of the strap, with the second end being located opposite the first end. The strap is positioned along the longitudinal axis of the slide battery pack and the cap is positioned over the first end of the strap and the second end of the strap with the first projection inserted through the first opening and the first collar and the second projection inserted through the second opening and the second collar to secure the cap to the strap and to the slide battery pack.

Implementations may include one or more of the following features. For example, the security device may further include a sensor that is disposed under the cap.

The cap may include only a first opening and a second opening.

The first projection and the second projection may be aligned along the longitudinal axis of the slide battery pack.

The cap may be removable from the strap using a cutting tool to cut at least one of the first projection and the second projection.

The strap may be positioned over a latch of the slide battery pack.

The first projection and the second projection each may include a conical-shaped head disposed on a stem. The first collar may include multiple flanges that narrow away from the first opening and the second collar may include multiple flanges that narrow away from the second opening, where the conical-shaped head of the first projection is not reversible through the first opening once inserted past the multiple flanges of the first collar and the conical-shaped head of the second projection is not reversible through the second opening once inserted past the multiple flanges of the second collar. The cap may be removable from the strap using a cutting tool to cut the stem of the first projection at a point where the stem extends beyond the multiple flanges of the first collar and the stem of the second projection at a point where the stem extends beyond the multiple flanges of the second collar. The stem of the first projection and the stem of the second projection each may include multiple supports that connect to both the stem and the top surface of the strap.

The strap may be made of rigid plastic that is shaped to match the contour of the slide battery pack along the longitudinal axis of the slide battery pack.

In another general aspect, a security device for a battery pack includes a cap that is shaped and configured to cover at least a portion of a slide mechanism of a slide battery pack. The cap includes only a single opening aligned along a longitudinal axis of the slide battery pack. The security device includes a strap having a first end and a second end that is located opposite the first end, where the second end includes a housing with an opening through a center of the housing to receive the first end. The cap is positioned on the slide battery pack and the strap is positioned along the longitudinal axis of the slide battery pack by inserting the first end of the strap through the single opening in the cap around the longitudinal axis of the slide battery pack and through the opening of the housing on the second end of the strap, where the housing is configured to allow movement of the first end of the strap only in a single direction.

Implementations may include one or more of the following features. For example, the security device may further include a sensor that is disposed under the cap.

The first end of the strap may be tapered.

The housing on the second end of the strap may be cube-shaped having the opening through the center of the housing.

The cap may be removable from the slide battery pack using a cutting tool to cut the strap between the housing on the second end of the strap and the cap.

In another general aspect, a method for using a security device to deter theft of a battery pack, includes providing a security device. The security device includes a cap that is shaped and configured to cover at least a portion of a slide mechanism of a slide battery pack. The cap includes a first collar disposed around a first opening and a second collar disposed around a second opening with the first collar and the second collar aligned along a longitudinal axis of the slide battery pack. The security device includes a strap that is shaped and configured to match a contour of the slide battery pack along the longitudinal axis of the slide battery pack. The strap includes a first end having a first projection that extends perpendicular from a top surface of the strap and a second end having a second projection that extends perpendicular from the top surface of the strap, with the second end being located opposite the first end. The method includes positioning the strap along the longitudinal axis of the slide battery pack and positioning the cap over the first end of the strap and the second end of the strap with the first projection inserted through the first opening and the first collar and the second projection inserted through the second opening and the second collar to secure the cap to the strap and to the slide battery pack.

Implementations may include one or more of the following features. For example, the security device may further include a sensor that is disposed under the cap.

The cap may include only a first opening and a second opening.

The first projection and the second projection may be aligned along the longitudinal axis of the slide battery pack.

The method may further include removing the cap from the strap using a cutting tool to cut at least one of the first projection and the second projection.

The details of one or more implementations are set forth in the accompa-nying drawings and the description below. Other features will be apparent from the description and drawings, and from the claims.

DETAILED DESCRIPTION

Figure 1:
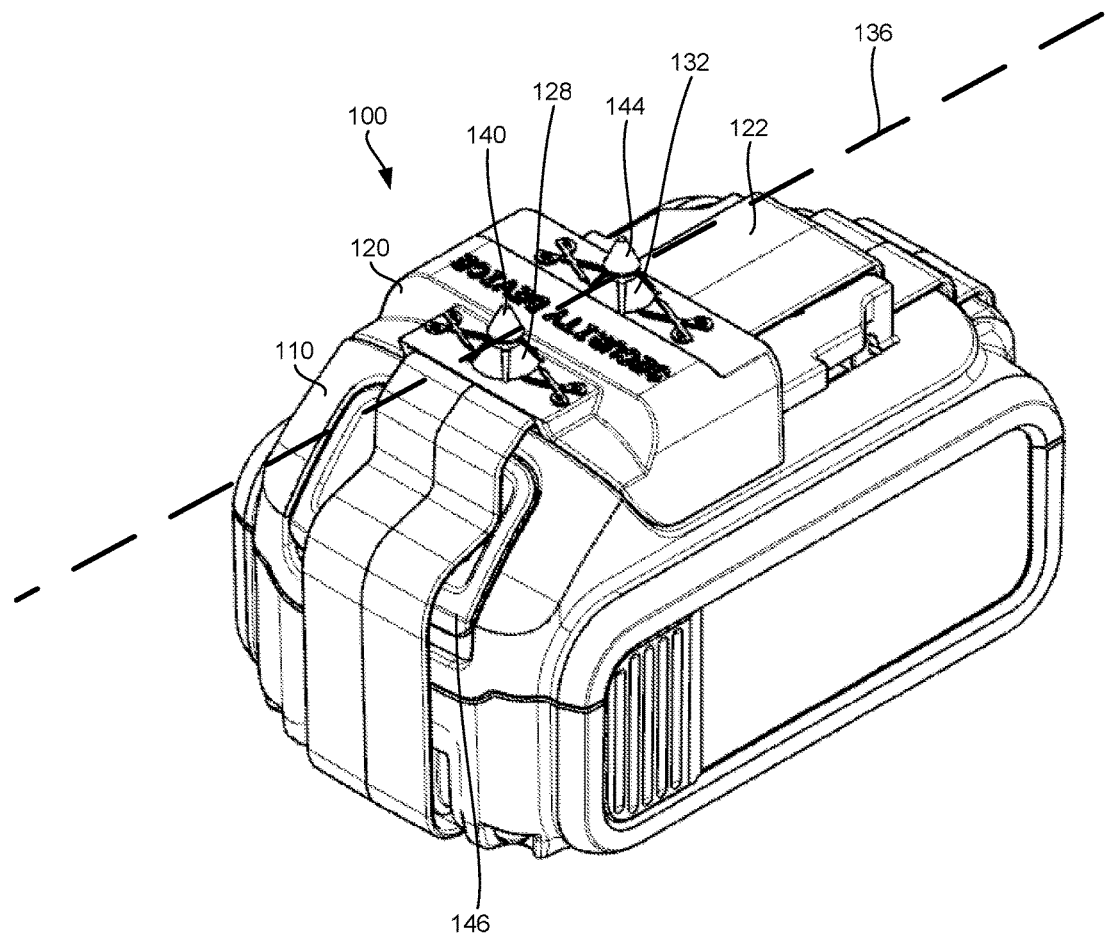
FIG. 1 is a perspective view of a first embodiment of a security device for a battery pack as secured to the battery pack.
Figure 2:
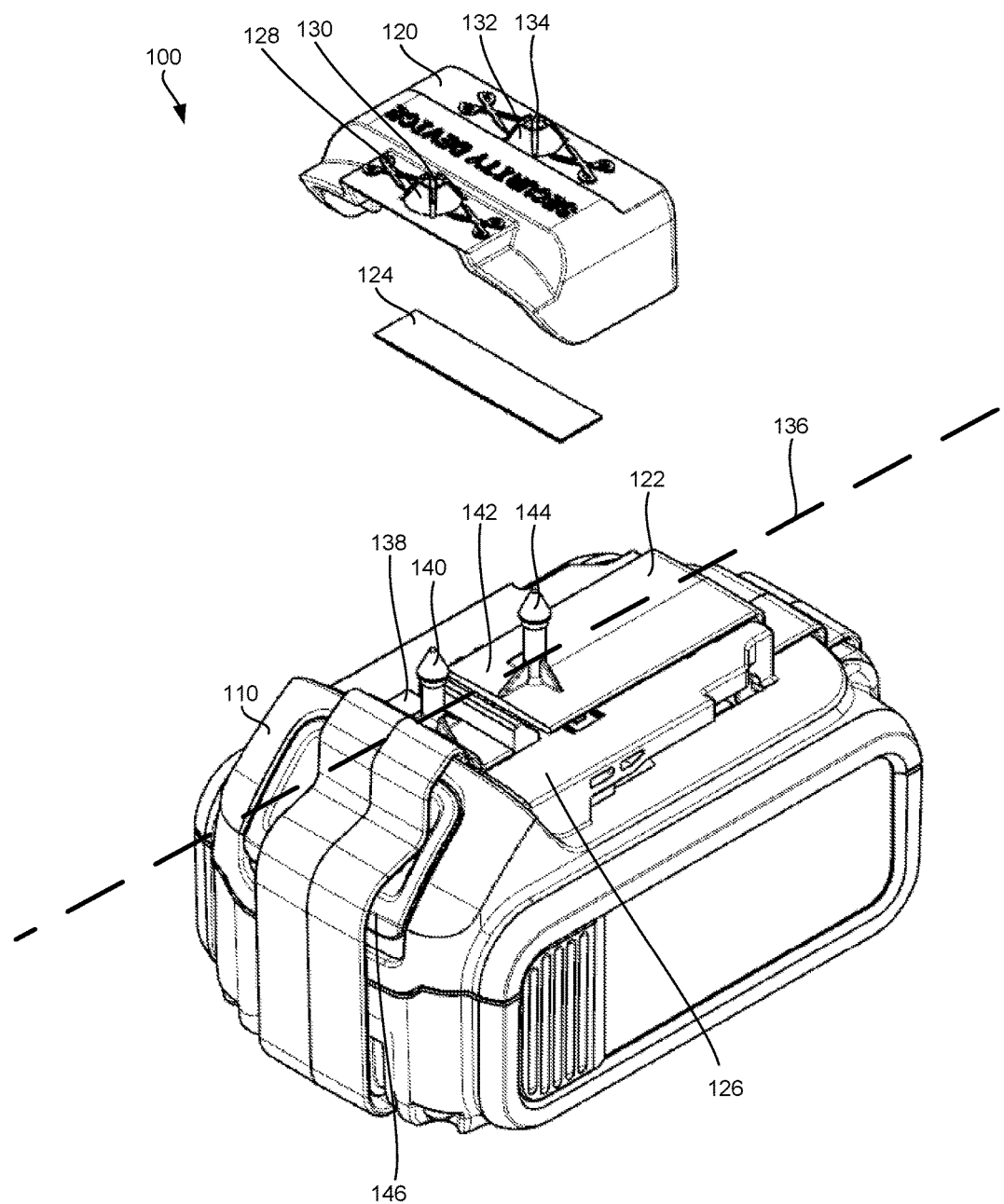
FIG. 2 is an exploded perspective view of the security device of FIG. 1.

FIG. 1 is a perspective view of a first embodiment of a security device 100 for a battery pack 110. The security device 100 is secured to the battery pack 110. FIG. 2 is an exploded perspective view of the security device 100 of FIG. 1. With reference to both FIG. 1 and FIG. 2, the security device 100, which also may be referred to as an anti-theft device, is used to deter the theft of the battery pack 110 from a store. In this example, the battery pack 110 is a slide battery pack. The battery pack 110 may be used to provide power to portable tools and equipment, such as power tools, lawn equipment and any other type of tools and equipment that may use battery packs for power. While the security device 100 is illustrated as being used with a slide battery pack, the security device 100 also may be used with other types of battery packs or other types of products.

The security device 100 includes a cap 120 and a strap 122. The security device also may include a sensor 124. The cap 120 is shaped and configured to cover at least a portion of a top part of the battery pack 110. In this example, the cap 120 is shaped and configured to cover at least a portion of a slide mechanism 126 of the battery pack 110. The slide mechanism 126 includes the components of the battery pack 110 such as rails and grooves that are used to mate the battery pack 110 physically and electrically to a tool or piece of equipment. The slide mechanism 126 may be contrasted with a tower mechanism on a tower battery pack (not shown), where the tower mechanism is inserted into a corresponding tower receptacle on a tool or piece of equipment configured to connect physically and electrically to a tower battery pack.

The cap 120 includes a first collar 128 disposed around a first opening 130 and a second collar 132 disposed around a second opening 134. The first collar 128 and the second collar 132 are aligned along a longitudinal axis 136 of the battery pack 110.

The strap 122 is shaped and configured to match a contour of the battery pack 110 along the longitudinal axis 136 of the battery pack 110. The strap 122 includes a first end 138 having a first projection 140 and a second end 142 having a second projection 144. The first projection 140 and the second projection 144 each extend perpendicular from a top surface of strap 122 with the first end 138 and the first projection 140 being located opposite from the second end 142 and the second projection 144.

The strap 122 is shaped to match the contour, or profile, of the battery pack 110. In this manner, the strap 122 is snug and secure to the battery pack 110 and is of a sufficient width that the strap 122 may not be easily removed by sliding it off the battery pack or by slipping a cutting implement between the strap 122 and the battery pack 110. The strap 122 also is positioned over a latch mechanism 146 of the battery pack 110 and the strap 122 is shaped to follow closely the contour of the latch mechanism 146. In this manner, the strap 122 may not be slid laterally past the sides of the latch mechanism 146 because the strap 122 is lower than the sides of the latch mechanism 146.

The strap 122 is positioned along the longitudinal axis 136 of the battery pack 110 and the cap 120 is positioned over the first end 138 of the strap 122 and the second end 142 of the strap 122. The cap 120 is positioned to insert the first projection 140 through the first collar 128 and the first opening 130 and to insert the second projection 144 through the second collar 132 and the second opening 134 to secure the cap 120 to the strap 122 and to the slide battery pack 110. Once the first projection 140 is inserted past the top of the first collar 128 and the second projection 144 is inserted through the top of the second collar 132, the first projection 140 and the second projection 144 are prevented from backing out of the first opening 130 and the second opening 134, respectively. A shape of the first projection 140 and the second projection 144 in cooperation with features of the first collar 128 and the second collar 132 prevent the cap 120 from lifting off the strap 122 by hand without the use of a cutting implement. In this manner, the cap 120 is secured to the strap 122 and the combination of the cap 120 and the strap 122 is secured to the battery pack 110.

The cap 120 is removable from the strap 122 by using a cutting implement, such as scissors or a knife, to cut either or both of the first projection 140 and the second projection 144. The cutting implement may be used to remove the top portion, or head, of either or both of the first projection 140 and the second projection 144 and, once removed, the cap 120 is easily lifted off the strap 122 and the strap 122 may be removed from around the battery pack 110.

In this example, the cap 120 and the strap 122 are configured for a specific battery pack 110 such that the shape of the cap 120 and the strap 122 matches the profile and contours of the battery pack 110. It is understood that the security device 100 concepts and features may be applied to other-shaped battery packs and other products, where the cap 120 and the strap 122 are shaped to match a particular battery pack or other product to prevent easy removal of the cap 120 and the strap 122 by hand without the aid of a cutting implement.

The security device 100 also may include the sensor 124. The sensor 124 may include any type of sensor used by stores as part of a security system to detect theft of a product.

For example, the sensor 124 may be a sensor such as an acousto-magnetic (A/M) sensor, a magnetic sensor, a radio-frequency (RF) sensor, as well as other types of sensors that would be used in conjunction with other equipment in the store to trigger an alarm if the product is removed from the store before the sensor has been deactivated so as to deter theft of the product.

Figure 3:
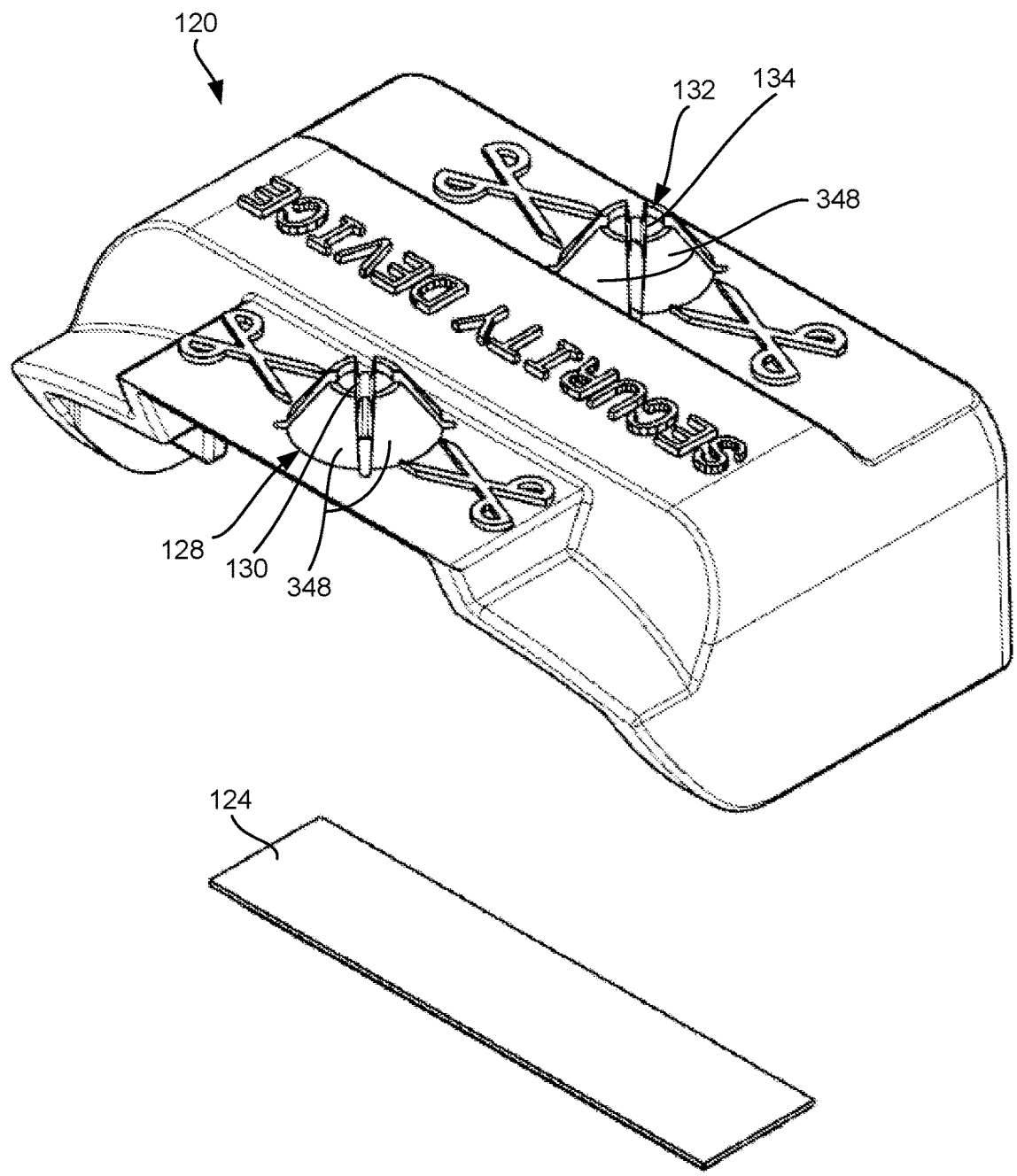
FIG. 3 is an exploded perspective view of a cap and a sensor of the security device of FIG. 1.

Referring to FIG. 3, an exploded perspective view of the cap 120 and the sensor 124 are illustrated. The cap 120 may be made from different materials including a rigid plastic. As discussed above, the cap 120 includes the first collar 128 disposed around the first opening 130 and the second collar 132 disposed around the second opening 134. The cap 120 may only include the first opening 130 and the second opening 134 and no other openings such that the remainder of the cap 120 is solid without other openings.

The first collar 128 and the second collar 132 each include multiple flanges 348 that narrow away from the first opening 130 and the second opening 134, respectively. The flanges 348 are flexible and may bend slightly outward as the first projection 140 and the second projection 144 push through and past the top of the flanges 348. Once the first projection 140 and the second projection 144 push past the top of the flanges 348, the flanges 348 spring back into position and collapse around the first projection 140 and the second projection 144 to prevent them from backing out of the first opening 130 and the second opening 134. In this manner, the first projection 140 and the second projection 144 may not be reversed or pulled back through the first opening 130 and the second opening 134, respectively.

Figure 4:
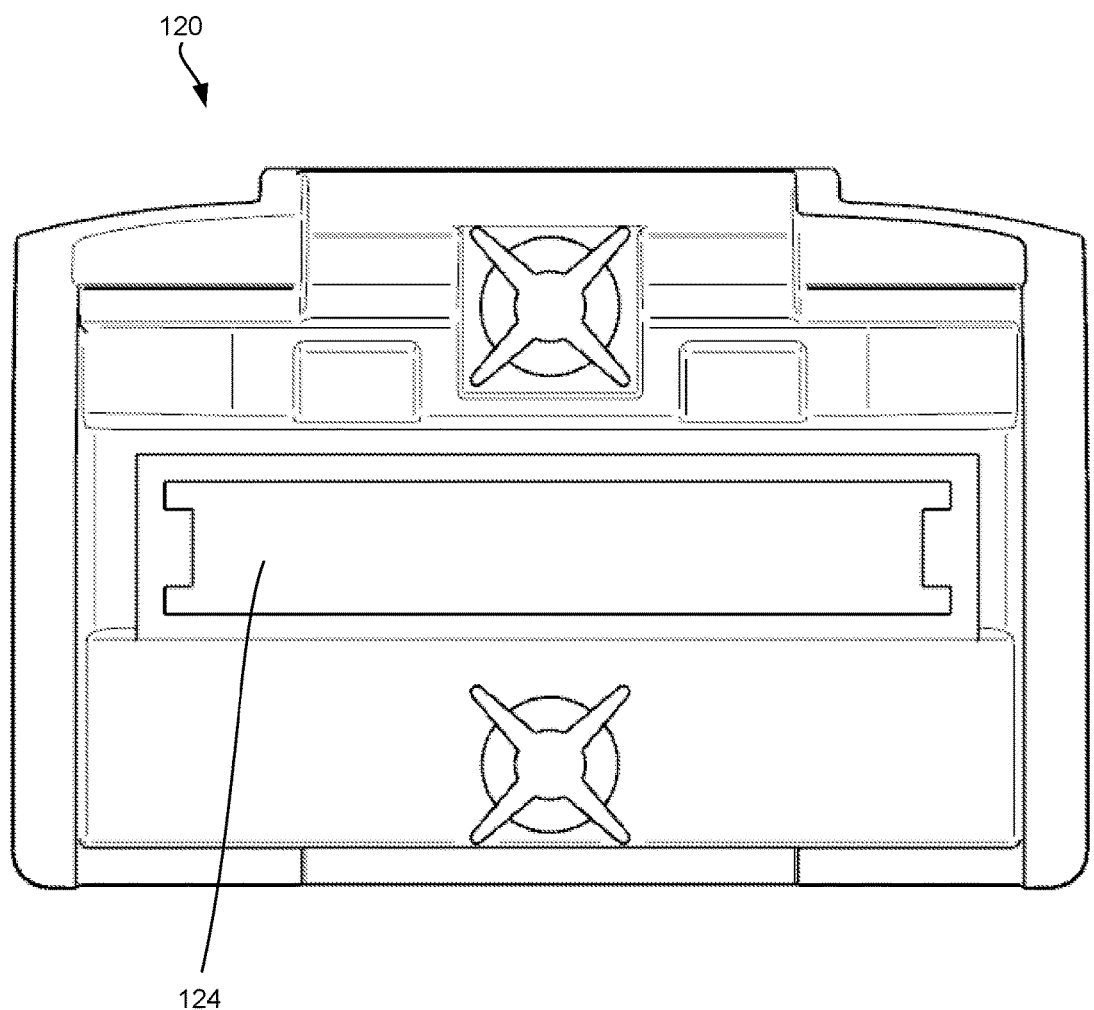
FIG. 4 is a bottom view of the sensor in the cap of the security device of FIG. 1.

FIG. 4 illustrates a bottom view of the cap 120 with the sensor 124 secured within the cap 120. The sensor 124 may be sized and shaped to fit within a cavity or hollow on the bottom of the cap 120 so that the sensor 124 is disposed under the cap 120 when the cap 120 is secured to the strap 122 and the battery pack 110. In this manner, the sensor 124 is hidden within the cap 120 and may not be removed without the use of a cutting implement. By locating the sensor 124 within the cap 120 and securing the cap 120 to the strap 122 and thus the battery pack 110, a more robust deterrent to theft of the battery pack 110 is provided.

The sensor 124 may be affixed to the cap 120 by any of various different means. In one implementation, the sensor 124 may use adhesive to adhere the sensor 124 to a bottom surface of the cap 120. Other means of affixing the sensor 124 to the cap 120 are possible as would be understood.

Figure 5:
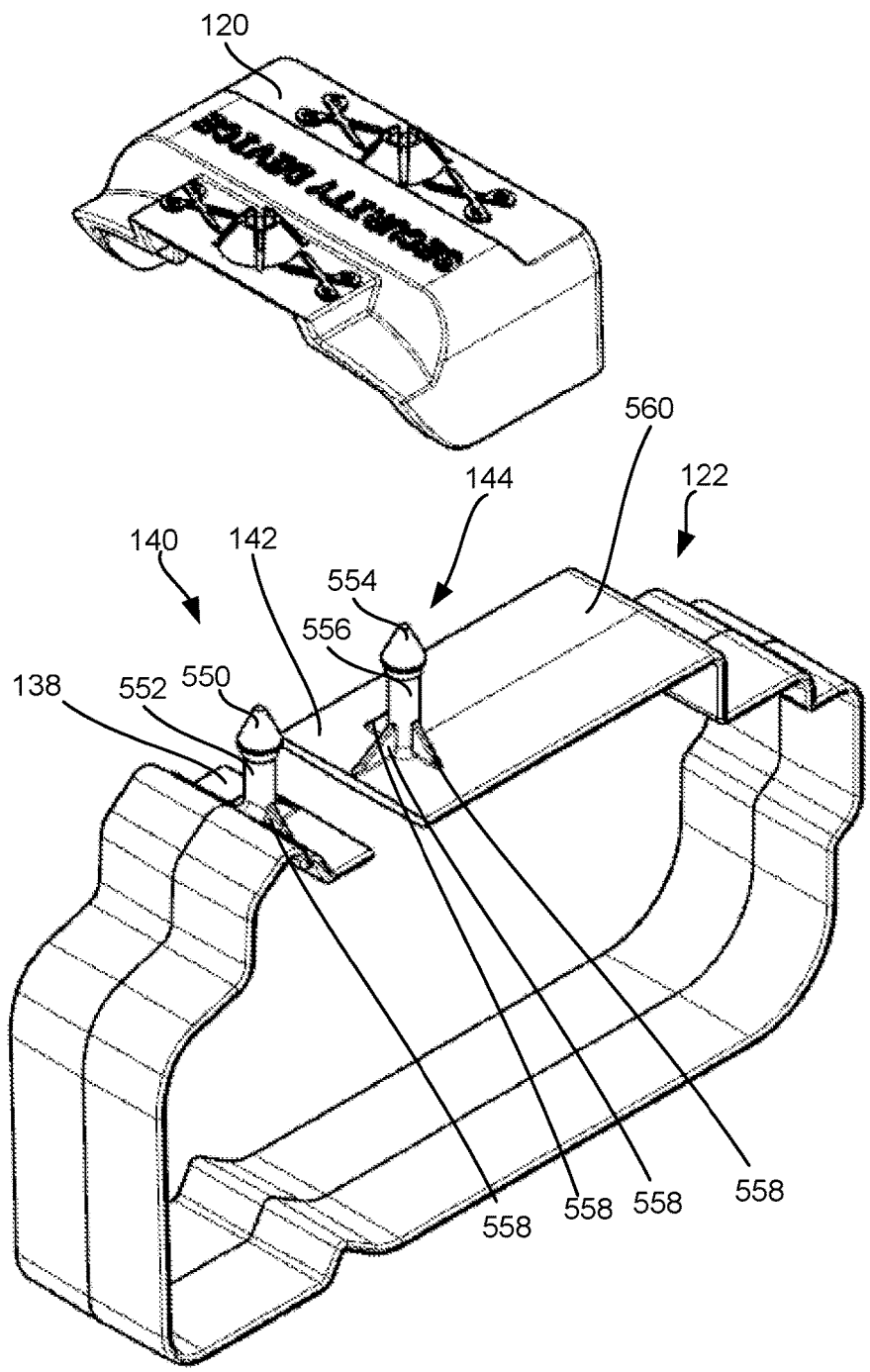
FIG. 5 is an exploded perspective view of the cap and a strap of the security device of FIG. 1.

FIG. 5 illustrates an exploded perspective view of the cap 120 and the strap 122 of the security device 100. The strap 122 may be made from a rigid plastic material that may be shaped as part of an injection molding process. The dimensions of the strap 122 match the contours and profile dimensions of the battery pack 100 to which the strap 122 will be secured. The strap 122 is non-continuous with the first end 138 separate from the second end 142.

The first projection 140 on the first end 138 includes a conical-shaped head 550 disposed on a stem 552. The second projection 144 on the second end 142 includes a conical-shaped head 554 disposed on a stem 556. Each of the stems 554 and 556 include multiple supports 558 that connect to the stems 552 and 556 and the top surface 560 of the strap 122. As noted above, the stems 552 and 556 project perpendicular to the top surface 560 of the strap 122.

When removing the cap 120 from the strap 122, a cutting implement may be used at the point just below the conical-shaped heads 550 and 554 to cut the conical-shaped heads 550 and 554 from the stems 552 and 556 to allow removal of the cap 120 from the strap 122.

Figure 6:
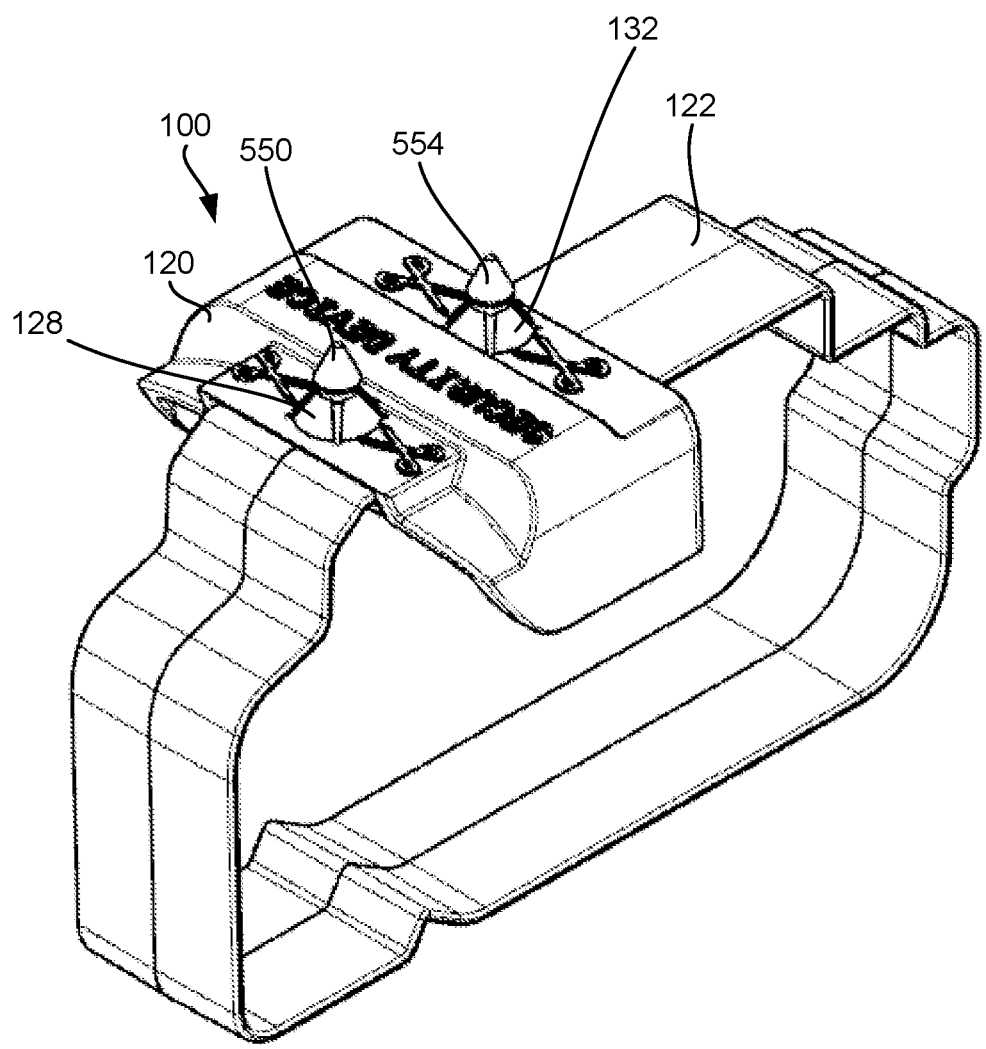
FIG. 6 is an assembled perspective view of the cap and the strap of the security device of FIG. 1.

FIG. 6 illustrates an assembled perspective view of the cap 120 and the strap 122 of the security device 100 without the battery pack. As illustrated, the cap 120 may include instructions and a visual cue to indicate where to place the cutting implement to remove the cap 120 from the strap 122. A small gap exists between the bottom of the conical-shaped heads 550 and 554 and the top of the first collar 128 and the second collar 132 to provide a space for the cutting implement to be placed.

Figure 7:
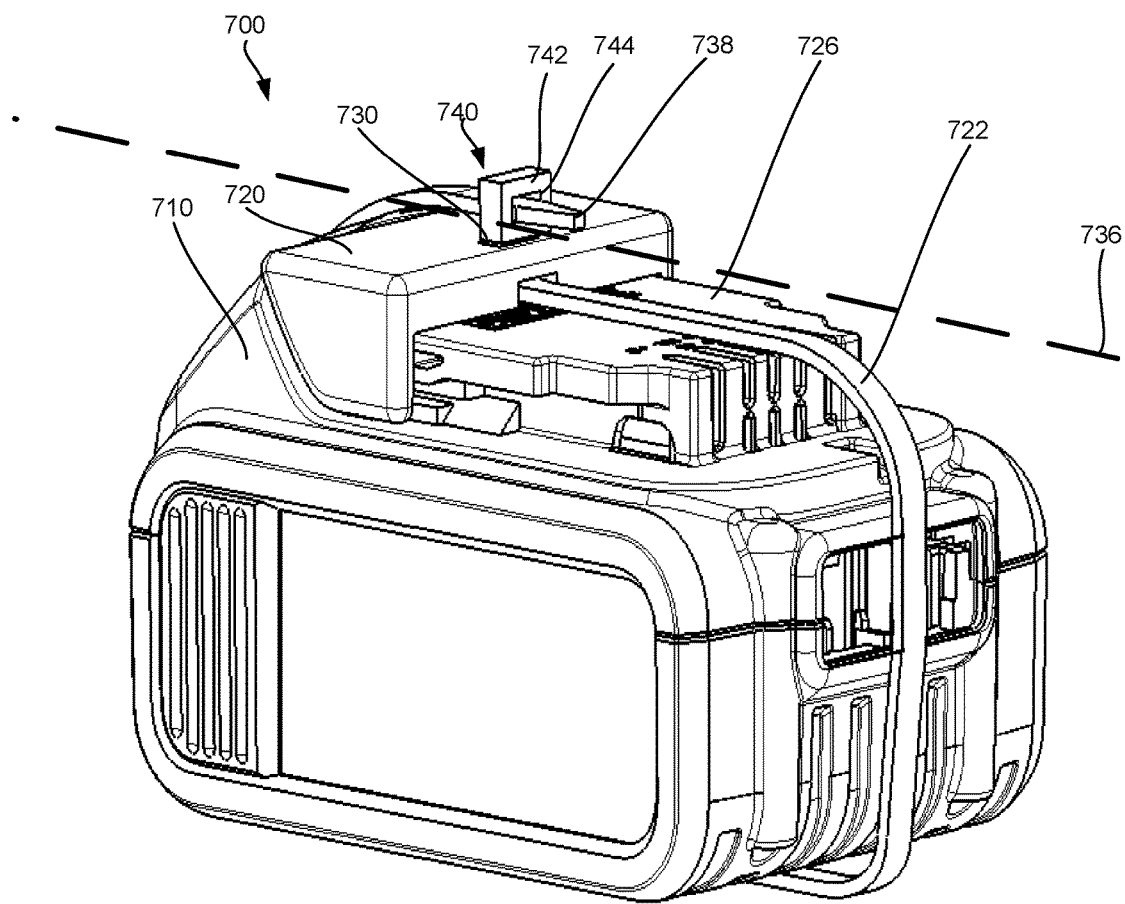
FIG. 7 is a perspective view of a second embodiment of a security device for a battery pack as secured to the battery pack.

FIG. 7 illustrates perspective view of a second embodiment of a security device 700 for a battery pack 710. The security device 700 is secured to the battery pack 710. The security device 700, which also may be referred to as an anti-theft device, is used to deter the theft of the battery pack 710 from a store. In this example, the battery pack 710 is a slide battery pack, although the security device 710 may be used on other types of battery pack and on other products.

Figure 8:
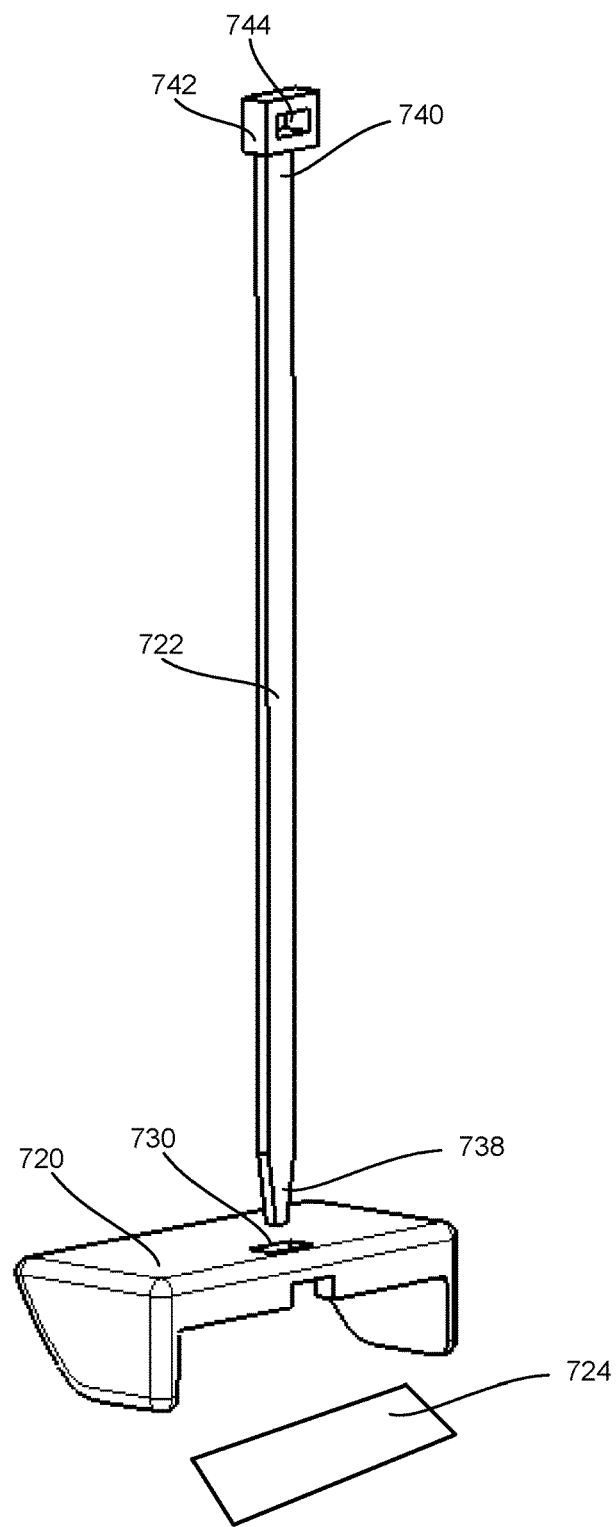
FIG. 8 is an exploded perspective view of a cap and a strap of the security device of FIG. 7.

The security device 700 includes a cap 720 and a strap 722. The security device 700 also may include a sensor 724, as shown in the exploded perspective view of the security device 700 in FIG. 8. The sensor 724 may be disposed beneath the cap 720 and affixed to the underside of the cap 720 such that the sensor 724 cannot be removed once the security device 700 is assembled to the battery pack 710. The sensor 724 includes the same features and functionality as the sensor 124 as described above in the first embodiment.

The cap 720 is shaped and configured to cover at least a portion of a top part of the battery pack 710. In this example, the cap 720 is shaped and configured to cover at least a portion of a slide mechanism 726 of the battery pack 710. The slide mechanism 726 includes the components of the battery pack 710 such as rails and grooves that are used to mate the battery pack 710 physically and electrically to a tool or piece of equipment.

Figure 9:
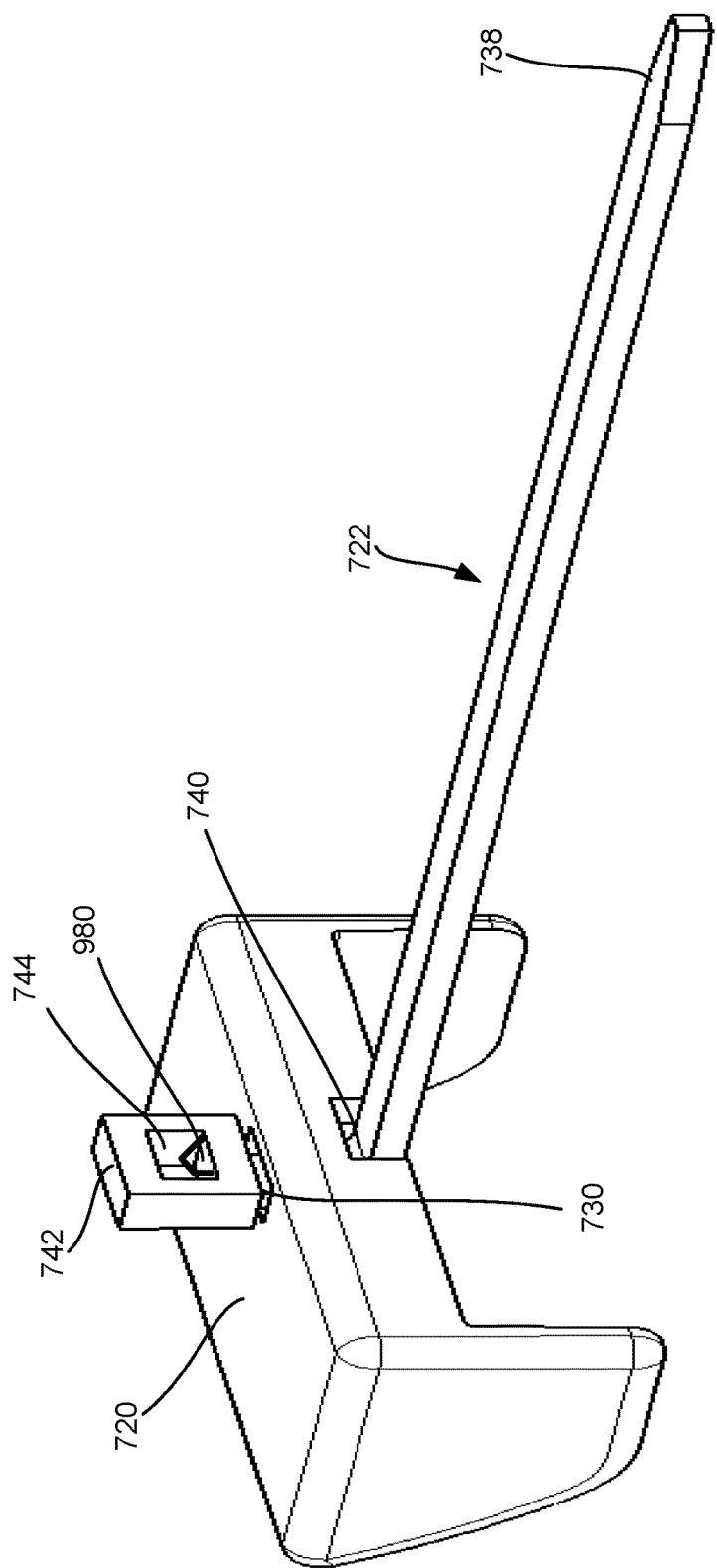
FIG. 9 is a perspective view of the strap inserted into the cap of the security device of FIG. 7.
Figure 10:
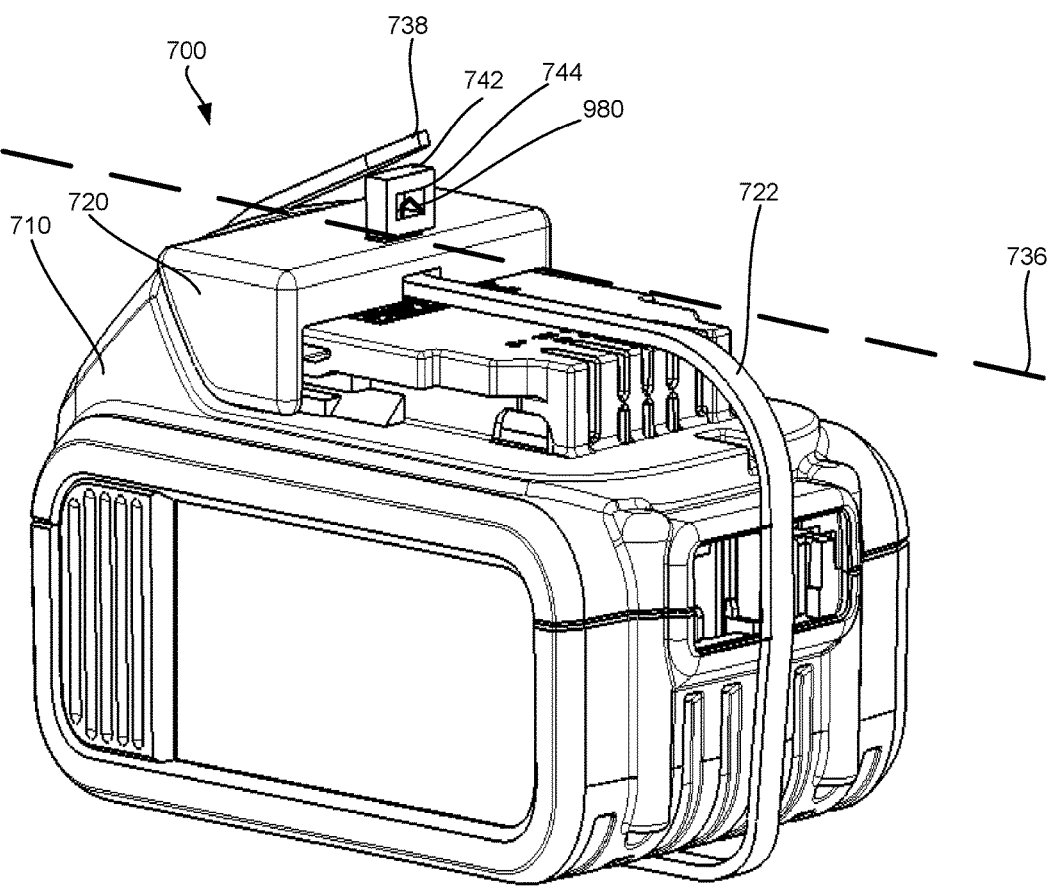
FIG. 10 is a perspective view of the strap and the cap of the security device of FIG. 7 as being secured to the battery pack.

Referring also to FIGS. 9 and 10, FIG. 9 illustrates a perspective view of the strap 722 inserted into the cap 720 and FIG. 10 illustrates a perspective view of the strap 722 and the cap 720 as being secured to the battery pack 710 just prior to securing the strap 722 back through itself. The cap 720 includes only a single opening 730 aligned along a longitudinal axis 736 of the battery pack 710. The opening 730 provides a location to pass a first end 738 the strap 722 through the cap 720 and around the longitudinal axis 736 of the battery pack 710 and back through a second end 740 of the strap 722 to secure the cap 720 and the strap 722 to the battery pack 710.

The first end 738 of the strap 722 is tapered to enable the first end 738 to pass through a housing 742 defining an opening 744 on the second end 740 of the strap 722. In one implementation, the housing 742 is cube-shaped and defines the opening 744 through the center of the housing 742. The housing 742 may include features to enable the strap 722 to pass in only one direction through the housing 742 and once entered not allow the strap 722 to reverse or back out of the housing 742. For example, the housing 742 may include a ratcheting feature 980 that may work in cooperation with features on the strap 722 to prevent the strap 722 from backing out of the housing 742, as illustrated in FIGS. 9 and 10. The features on the strap 722 may include ridges and grooves along a portion or all of one or both sides of the strap 722. It is understood that other means may be employed to prevent the strap 742 from reversing or backing out of the housing 742 once inserted. In this manner, the housing 742 is configured to allow movement of the first end 738 of the strap 722 only in a single direction. With the strap 722 securing the cap 720 to the battery pack 710, the security device 700 is harder to remove by hand without the aid of a cutting implement and thus acts as a deterrent to theft in the store since the hidden sensor 724 cannot easily be removed.

The cap 720 is removable from the battery pack 710 using a cutting implement, such as scissors or a knife, to cut the strap 722 between the housing 742 on the second end 740 of the strap 722 and the cap 720. In this manner, the cap 720 is easy to remove using a cutting implement once the battery pack 710 has been purchased and is outside of the store.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A security device for a battery pack, comprising:
a cap that is shaped and configured to cover at least a portion of a slide mechanism of a slide battery pack without the slide mechanism and the slide battery pack penetrating through the cap, the cap including a first collar disposed around a first opening and a second collar disposed around a second opening with the first collar and the second collar aligned along a longitudinal axis of the slide battery pack; and
a strap that is shaped and configured to match a contour of the slide battery pack along the longitudinal axis of the slide battery pack, the strap including a first end having a first projection that extends perpendicular from a top surface of the strap and a second end having a second projection that extends perpendicular from the top surface of the strap, the second end being located opposite the first end, wherein
the strap is positioned along the longitudinal axis of the slide battery pack and the cap is positioned over the first end of the strap and the second end of the strap with the first projection inserted through the first opening and the first collar and the second projection inserted through the second opening and the second collar to secure the cap to the strap and to the slide battery pack.

2. The security device of claim 1, further comprising a sensor that is disposed under the cap.

3. The security device of claim 1, wherein the first opening and the second opening are the only openings through the cap.

4. The security device of claim 1, wherein the first projection and the second projection are aligned along the longitudinal axis of the slide battery pack.

5. The security device of claim 1, wherein the cap is removable from the strap using a cutting tool to cut at least one of the first projection and the second projection.

6. The security device of claim 1, wherein the strap is positioned over a latch of the slide battery pack.

7. The security device of claim 1, wherein:
the first projection and the second projection each include a conical-shaped head disposed on a stem; and
the first collar includes multiple flanges that narrow away from the first opening and the second collar includes multiple flanges that narrow away from the second opening, wherein
the conical-shaped head of the first projection is not reversible through the first opening once inserted past the multiple flanges of the first collar and the conical-shaped head of the second projection is not reversible through the second opening once inserted past the multiple flanges of the second collar.

8. The security device of claim 7, wherein the cap is removable from the strap using a cutting tool to cut the stem of the first projection at a point where the stem extends beyond the multiple flanges of the first collar and the stem of the second projection at a point where the stem extends beyond the multiple flanges of the second collar.

9. The security device of claim 7, wherein the stem of the first projection and the stem of the second projection each include multiple supports that connect to both the stem and the top surface of the strap.

10. The security device of claim 1, wherein the strap is made of rigid plastic that is shaped to match the contour of the slide battery pack along the longitudinal axis of the slide battery pack.

11. A security device for a battery pack, comprising:
a cap that is shaped and configured to cover at least a portion of a slide mechanism of a slide battery pack without the slide mechanism and the slide battery pack penetrating through the cap, the cap including a single opening aligned along a longitudinal axis of the slide battery pack, wherein the single opening is the only opening on a top portion of the cap; and
a strap including a first end and a second end that is located opposite the first end, wherein the second end includes a housing with an opening through a center of the housing to receive the first end, wherein
the cap is positioned on the slide battery pack and the strap is positioned along the longitudinal axis of the slide battery pack by inserting the first end of the strap through the single opening in the cap around the longitudinal axis of the slide battery pack and through the opening of the housing on the second end of the strap, wherein the housing is configured to allow movement of the first end of the strap only in a single direction.

12. The security device of claim 11, further comprising a sensor that is disposed under the cap.

13. The security device of claim 11, wherein the first end of the strap is tapered.

14. The security device of claim 11, wherein the housing on the second end of the strap is cube-shaped having the opening through the center of the housing.

15. The security device of claim 11, wherein the cap is removable from the slide battery pack using a cutting tool to cut the strap between the housing on the second end of the strap and the cap.

16. A method for using a security device to deter theft of a battery pack, the method comprising:
providing a security device including:
a cap that is shaped and configured to cover at least a portion of a slide mechanism of a slide battery pack without the slide mechanism and the slide battery pack penetrating through the cap, the cap including a first collar disposed around a first opening and a second collar disposed around a second opening with the first collar and the second collar aligned along a longitudinal axis of the slide battery pack, and
a strap that is shaped and configured to match a contour of the slide battery pack along the longitudinal axis of the slide battery pack, the strap including a first end having a first projection that extends perpendicular from a top surface of the strap and a second end having a second projection that extends perpendicular from the top surface of the strap, the second end being located opposite the first end;
positioning the strap along the longitudinal axis of the slide battery pack; and positioning the cap over the first end of the strap and the second end of the strap with the first projection inserted through the first opening and the first collar and the second projection inserted through the second opening and the second collar to secure the cap to the strap and to the slide battery pack.

17. The method of claim 16, wherein the security device further comprises a sensor that is disposed under the cap.

18. The method of claim 16, wherein the first opening and the second opening are the only openings through the cap.

19. The method of claim 16, wherein the first projection and the second projection are aligned along the longitudinal axis of the slide battery pack.

20. The method of claim 16, further comprising removing the cap from the strap using a cutting tool to cut at least one of the first projection and the second projection.

* * * * *